Feb. 20, 1934.   A. A. FORDE   1,948,170
VEHICLE DUMP BODY
Filed June 29, 1931   3 Sheets-Sheet 1
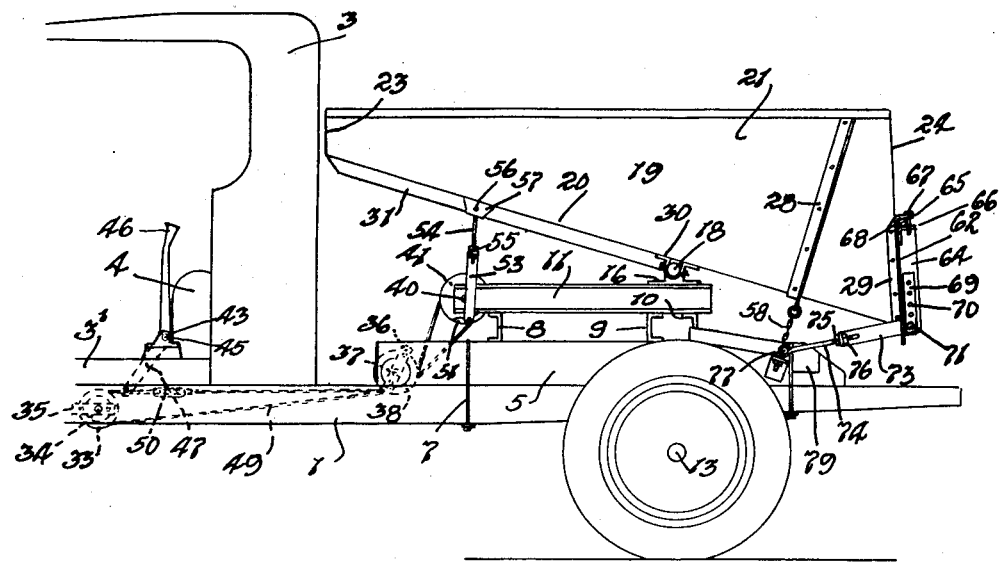
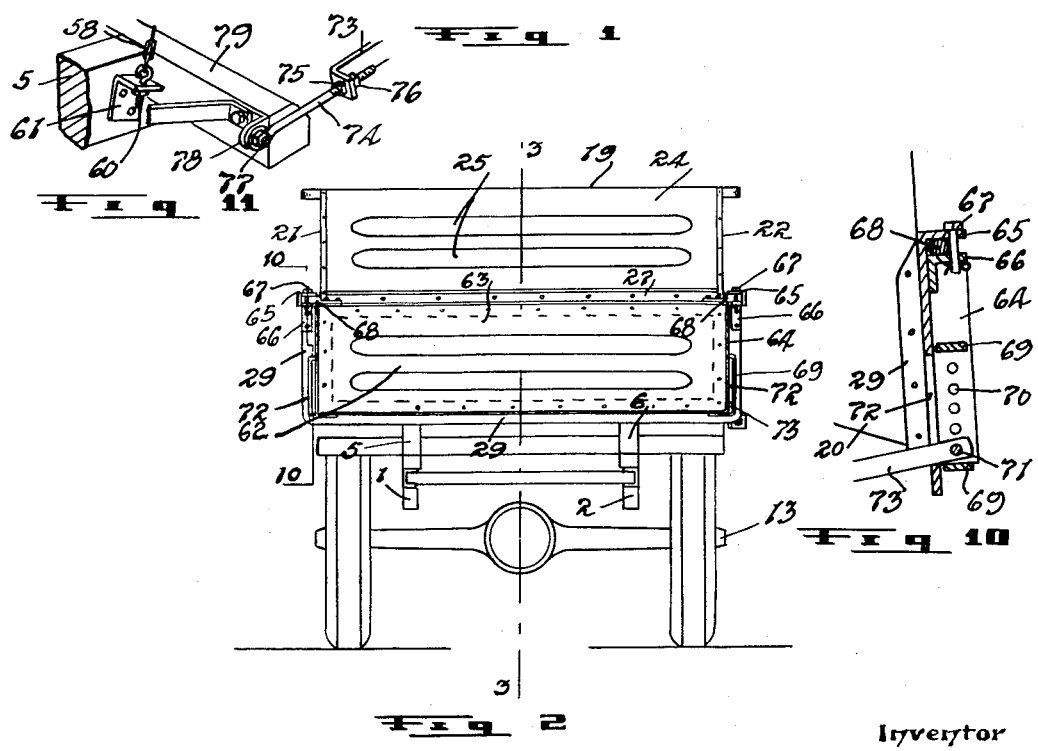
Inventor
A. A. Forde Feb. 20, 1934.  A. A. FORDE  1,948,170
VEHICLE DUMP BODY
Filed June 29, 1931   3 Sheets-Sheet 2
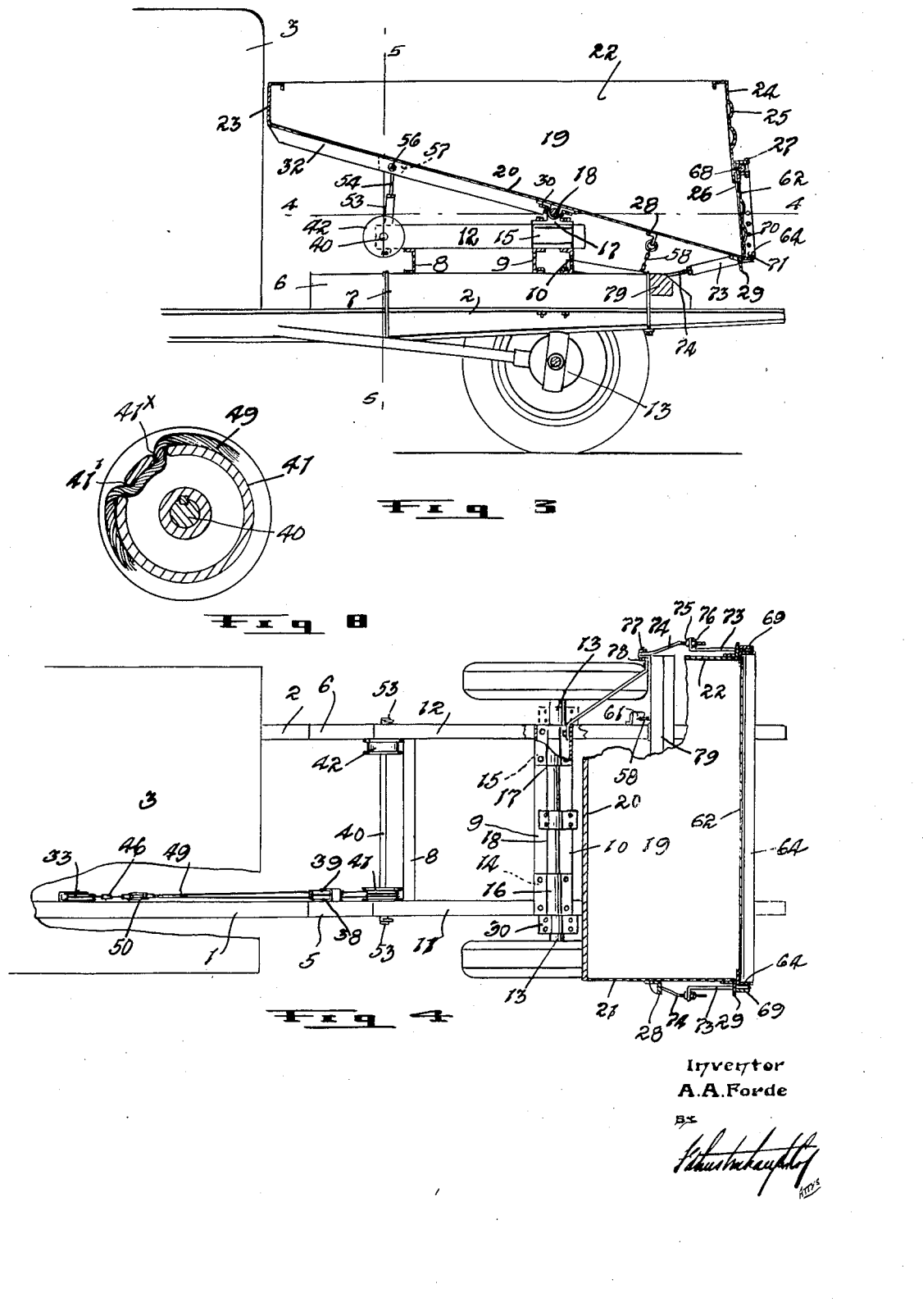

Feb. 20, 1934.  A. A. FORDE  1,948,170
VEHICLE DUMP BODY
Filed June 29, 1931  3 Sheets-Sheet 3
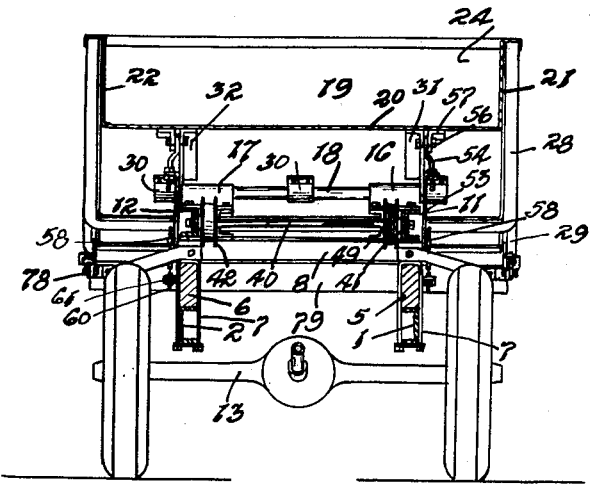
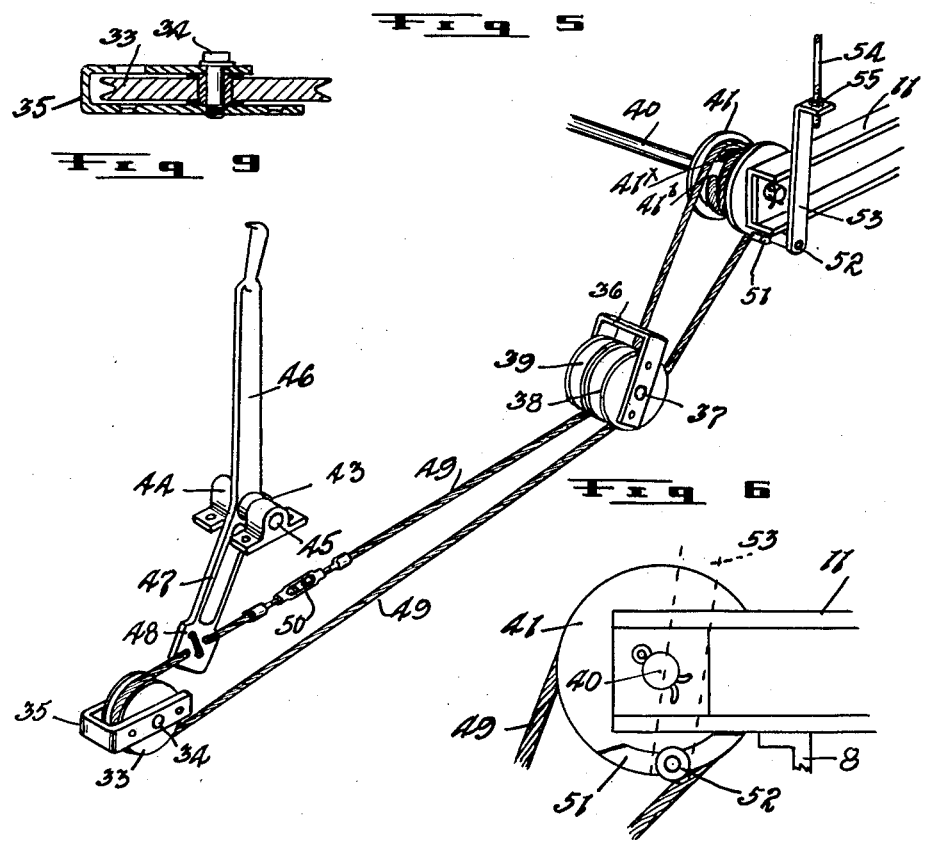
Inventor
A. A. Forde Patented Feb. 20, 1934

1,948,170

UNITED STATES PATENT OFFICE 1,948,170

VEHICLE DUMP BODY

Arthur A. Forde, Vista, Manitoba, Canada

Application June 29, 1931. Serial No. 547,598

1 Claim. (Cl. 298—23)

The invention relates to improvements in vehicle dump bodies and an object of the invention is to provide a dump body for a commodity such as gravel, sand and so forth which is mounted and constructed so that it can be readily dumped and such that when dumped, the flow of the commodity is regulated and distributed to spread the commodity at a predetermined depth on the road surface providing of course that a predetermined speed of travel is maintained.

A further object is to construct the box and the various operating mechanism associated therewith so that the same can be readily mounted on an existing truck body and such that the complete operation of the device when once set can be controlled by the operator or driver in the truck cab through the manipulation of an operating lever therein provided.

A further object is to construct the device so that when travelling light or empty, there is practically no rattling of the box or associated parts permitted and further such that the operator, if he so desires, can hold the box in any dumped position or return the box to its original position subsequent to having started spreading operations.

A further object of the invention is to provide the rearwardly dumpable box with a closure gate hinged to the box and operably connected to the main frame of the vehicle whereby when the box is dumped, the gate is automatically opened and further to construct the parts so that the amount which the gate is opened in the fully dumped position of the box can be regulated as desired, this permitting of a variation in the depth of spread of the gravel on the road surface as desired, assuming of course that the speed of travel of the vehicle over the road is maintained constant.

A further object is to construct the whole device in a simple and durable manner and so that all parts can be easily fabricated and assembled.

A further object is to provide a structure which will insure of the box being automatically and positively locked in its normal or non-dumped position and to arrange that structure so that it will become automatically unlocked upon the operator manipulating the control lever for dumping the box.

With the above more important objects in view, the invention consists essentially in the arrangement and construction of parts hereinafter more particularly described, reference being had to the accompanying drawings, in which:—

Fig. 1 is a side view of the vehicle dump body as it appears mounted on a truck frame.

Fig. 2 is a rear end view.

Fig. 3 is a vertical sectional view at 3—3 Figure 2.

Fig. 4 is a plan view, part of the cab and part of the box being broken away.

Fig. 5 is a vertical cross sectional view at 5—5 Figure 3.

Fig. 6 is a perspective view of the operating cable and associated parts.

Fig. 7 is an enlarged detailed side view of one of the pulleys.

Fig. 8 is a vertical sectional view through the pulley shown in Figure 7.

Fig. 9 is a cross sectional view through another of the pulleys.

Fig. 10 is a vertical sectional view at 10—10 Figure 2.

Fig. 11 is a perspective view of the rear cross beam and certain parts associated therewith.

In the drawings like characters of reference indicate corresponding parts in the several figures.

The dump body hereinafter disclosed is mounted on the well known type of automobile truck and the details of which latter on such account are not herein given. The side beams of the customary truck chassis are indicated at 1 and 2 and the chassis is carried by the customary truck wheels and is provided forwardly with the usual operator's cab 3 containing the driver's seat 4. The dump box used is entirely controlled by the driver in the cab.

On the side beams 1 and 2, I mount a pair of opposing similar sills 5 and 6 secured permanently to the side beams by U-bolts 7. On the sills 5 and 6, I mount forwardly a channel bar 8 and rearwardly a pair of spaced channel bars 9 and 10, all the channel bars crossing the sills and being permanently fastened thereto. On the ends of the channel bars 8, 9 and 10, I mount a pair of similar opposing lengthwise extending channel irons 11 and 12 permanently fastened to the underlying channel bars and lying directly over the sills. It will be observed that the channel irons 9 and 10 are located more or less directly over the rear axle 13 of the truck.

On the bars 9 and 10 to the inner sides of the bars 11 and 12, I secure two short length angle bars 14 and 15 and these latter bars and the bars 11 and 12 support relatively large bearings 16 and 17 which receive a pivot shaft 18.

The dump box 19 is formed from sheet metal and presents an inclined bottom 20, upstanding sides 21 and 22, a relatively shallow front end 23 and has the rear end partially closed by a back plate 24 secured permanently to the rear ends of the sides and suitably ribbed as indicated at 25 to reinforce the same. A substantially rectangular outlet opening 26 appears between the lower edge of the plate 24 and the rear end of the box bottom. The upper edges of the box are bent into a channel cross section to reinforce the same and an angle bar 27 is permanently riveted to the lower edge of the plate 24. A reinforcing angle bar 28 passes down the sides and across the bottom of the rear end of the box being securely riveted thereto and the sides of the box at the ends of the openings 26 are reinforced by an angle bar 29 riveted thereto, the angle bar passing also across the under side of the box bottom at the rear.

To the under side of the box, I permanently secure three similar equi-spaced bearing straps and these straps pivotally receive the shaft 18 and pivotally support the box on the shaft. To the bottom of the box, I also secure two lengthwise extending spaced reinforcing angle bars 31 and 32 which have their front ends terminated adjacent the forward end of the box and their rear ends terminating adjacent the shaft.

On the inner side of the side beam 1 of the chassis, I locate a flanged pulley 33 which is carried rotatably by a shaft 34 supported in a U-shaped bearing strap 35, the strap being bolted to the side beam. To the inner side of the sill 5 and adjacent the front end thereof, I secure a U-shaped bearing bracket 36 carrying a cross shaft 37 on which I mount a pair of flanged pulleys 38 and 39, the pulley 38 being contained in the same vertical plane as that 33. The forward ends of the beams 11 and 12 carry rotatably an operating shaft 40 and on the ends of this shaft adjacent the inner sides of the beams 11 and 12, I mount comparatively wide faced flanged pulleys 41 and 42, the pulleys being secured in any suitable manner to the shaft to rotate therewith and the pulley 41 being directly opposite those 38 and 39.

The floor 3' of the cab carries a pair of spaced bearings 43 and 44 supporting a cross pin 45 and the pin carries an operating lever 46 having the lower end formed into a crank 47 which protrudes through a suitable slot provided in the floor and has the lower end thereof provided with four holes 48. A length of cable 49 is provided and the cable has one end threaded forwardly and backwardly through the holes and the other end passed first around the pulley 33, then under the pulley 38, then around the pulley 41, then under the pulley 39 and finally connected to the former end of the cable by a turn buckle 50 of well known type, the turn buckle permitting of the tightening up of the cable should the same become slack.

To insure of the positive turning of the pulley 41 with the cable, I have provided the face of the pulley with two spaced holes 41' and 41$^x$ and the cable is passed through these holes in a manner shown in Figure 8 to effectively anchor it against slipping at such point on the pulley. The lever is located within convenient range of the driver when sitting on his seat 4 and according to the arrangement, the driver can rotate the shaft 40 in either direction by manipulating the lever forwardly or backwardly. I might here remark that the pulley 42 does not receive a cable and is simply made the same as that 41 to facilitate construction.

Each of the pulleys 41 and 42 are provided at their outer faces with stop shoes 51 designed in the rotation of said pulleys to engage with the under and the top sides of the forward ends of the bars 11 and 12. In Figure 7, the shoe 51 is shown as having one end engaged with the under side of the bar 11 and from this figure, it will be seen that if the pulley be rotated, the left hand end of the shoe shown will swing around and strike the top side of the bar and limit the rotation of the pulley in that direction.

Each shoe carries centrally a pivot pin 52 and on this pin, I mount in each instance, the lower end of a connecting bar 53 which has the upper end out turned and provided with a hole to receive a threaded bolt 54 supplied above and below the out turned end of the bar with adjusting nuts 55. The upper end of the bolt 54 terminates in an eye which receives a pivot pin 56 carried by the adjacent bar 31 or 32 and an applied angle bracket 57 opposing the bar and secured permanently to the under side of the box.

It will be observed (see Figure 7) that when the rear end of the shoe 51 is in contact with the under side of the bar 11, the pin 52 is to the rear of a vertical line passing through the centre of the cross shaft 40 so that in such position of said parts, the bar 53 is locked against movement.

To the bar 28 in a location underneath the rear end of the box, I connect similar chains 58 which have their lower ends secured to an eye bolt 60 carried by an angle bracket 61 fastened to the outer sides of the rear ends of the sills 5 and 6. These chains positively limit the up swing of the rear end of the box and when all parts are properly adjusted, it will be apparent that in the normal load receiving position of the box as shown, the box is held against rattling as the chains limit the up swing of the rear end and the bars 53 and bolts 54 are exerting a down pull on the forward end of the box. The box is of course free to dump the instant the operator moves the upper end of the lever forwardly as such movement will swing the pins 52 ahead of the vertical line containing the shaft 40.

To the rear end of the box, I pivotally connect a gate 62 which is adapted normally to close the outlet opening 26. The gate embodies a rectangular metallic body plate 63 longitudinally ribbed for strengthening purposes and having the edges and ends reinforced by applied angle bars 64. The extremities of the up turned ends of the angle bar 29 are turned rearwardly as indicated at 65 and directly underneath these, I locate angle plates 66 riveted to the out turned flange of the bar 29. Similar pins 67 are passed through the ends 65 of the angle bar and through the brackets 66 and these pins retain pivot pins 68 permanently secured to the upper corners of the gate and entered between the ends 65 of the angle bar and the angle bracket 66.

According to this construction, it is a very easy matter to dismount the gate at any time as one has simply to withdraw the pin 67 and the pivot pins 68 can then be slid rearwardly from between the ends of the bar 29 and the angle plates.

To the rear turned flanges of the angle bars 64 reinforcing the ends of the gate, I secure straps 69 which have the body portions thereof spaced from said angle bars. The straps and the latter angle bars are supplied with opposing pairs of adjusting openings 70 to receive adjusting bolts 71. The out turned flange of the angle bar 29 is provided at each side of the box with a vertical slot 72 and similar bars 73 are provided having their rear ends passing through the slots 72 and pivotally connected to the gates by the bolts 71. The forward ends of these bars are out turned and receive slidably an adjusting rod 74 which is screw threaded and provided with adjusting nuts 75 and 76. The forward end of the rod in each instance is pivotally connected by a pivot bolt 77 to an angle bracket 78 permanently fastened to a rear cross beam 79 carried by the rear ends of the sills 5 and 6.

When the box is in its normal or non-dumped position, one will adjust the nuts 75 and 76 so that the gate is held tightly closed and in this connection, it will be also noted that the bolt 71 can be adjusted in regard to the gate, the adjustment given in the latter instance depending on the distance it is desired the gate to open.

In order to fully understand the invention, I will now describe the manner in which the device is operated assuming that the box contains say a load of gravel for spreading on a road surface.

The depth at which the gravel is to be spread on the road will be first determined and if it be say two inches, then the bolts 71 and the nuts 75 and 76 will be adjusted to permit of sufficient flow of gravel from the box in the dumper position to cover the road with a two inch depth of gravel provided a predetermined constant speed of travel is maintained.

When the time arrives for the gravel to be spread on the road, the operator will shift the lever 46 ahead and this will positively dump the box rearwardly and as the rear end of the box swings downwardly, the gate will be automatically opened due to the fact that the bars 73 and rods 74 extend between the gate and the main frame of the truck. If it is desired at any time to stop the spreading of the gravel, the lever can be pulled back and the box will swing up to its original position and the gate will close.

An experienced operator will be able with this device to spread gravel as he desires. Obviously if he wishes to spread say two inches of gravel when travelling at say ten miles an hour, he will set the gate so that the opening in the dumped position of the box will permit a flow sufficient to cover at two inch depth at the speed stated. Obviously with the same said conditions of the gate and an increased speed, the spread of gravel on the road surface can be diminished to whatever depth is desired. As the operator can also manipulate the lever and open or close the gate, it is possible for him by doing this or by varying his speed of travel to spread the gravel at any depth as he wishes.

This device with an experienced operator will do the work of spreading the gravel on a road or similar surface very much quicker than is done at the present time by dumping loads of gravel at intervals on the road surface and then spreading them to the desired thickness with a road scraper and further the job when completed will be much better as the depth of the spread gravel will be more regular.

While I have entered into a detailed description of the various parts, it will of course be understood that various parts might be structurally modified without departing from the spirit of the invention as set forth in the accompanying claim.

What I claim as my invention is:—

In combination, a supporting frame, a rearwardly dumpable commodity receiving box pivotally carried by the frame, a rear closure gate pivotally carried by the rear end of the box and operating connections between the gate and the frame, said connections being attached to the gate to permit of adjustment towards or away from the pivot point of the gate and being further adjustable in length between the gate and the frame.

ARTHUR A. FORDE.